United States Patent
Wilhelmsson et al.

(10) Patent No.: US 10,075,274 B2
(45) Date of Patent: Sep. 11, 2018

(54) ACCESS POINT, A WIRELESS STATION AND METHODS THEREIN FOR MULTI-USER CLEAR TO SEND TRANSMISSIONS

(71) Applicant: Telefonaktiebolaget LM Ericsson (publ), Stockholm (SE)

(72) Inventors: Leif Wilhelmsson, Dalby (SE); Dzevdan Kapetanovic, Lund (SE); Thomas Nilsson, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 43 days.

(21) Appl. No.: 15/029,386

(22) PCT Filed: Mar. 3, 2016

(86) PCT No.: PCT/EP2016/054502
§ 371 (c)(1),
(2) Date: Apr. 14, 2016

(87) PCT Pub. No.: WO2017/076515
PCT Pub. Date: May 11, 2017

(65) Prior Publication Data
US 2017/0264416 A1   Sep. 14, 2017

Related U.S. Application Data

(60) Provisional application No. 62/251,716, filed on Nov. 6, 2015.

(51) Int. Cl.
*H04W 72/04*   (2009.01)
*H04L 5/00*    (2006.01)
*H04W 74/08*   (2009.01)
(Continued)

(52) U.S. Cl.
CPC .......... *H04L 5/0053* (2013.01); *H04L 5/0037* (2013.01); *H04W 8/005* (2013.01);
(Continued)

(58) Field of Classification Search
CPC .... H04L 5/0053; H04L 5/0037; H04W 8/005; H04W 72/042; H04W 74/006; H04W 74/0816
See application file for complete search history.

(56) References Cited

U.S. PATENT DOCUMENTS

2010/0309871 A1   12/2010   Fischer et al.
2011/0317630 A1   12/2011   Zhu et al.
(Continued)

FOREIGN PATENT DOCUMENTS

WO   2011123639 A1   10/2011
WO   2014123357 A1   8/2014
(Continued)

OTHER PUBLICATIONS

Huang, P.-K., et al., "MU-RTS/CTS for DL MU", Jul. 14, 2015, pp. 1-24, IEEE 802.11-15/0867r1.
(Continued)

*Primary Examiner* — Phuc Tran
(74) *Attorney, Agent, or Firm* — Coats & Bennett, PLLC

(57) ABSTRACT

An Access Point (AP) 402 and a method therein for Multi-User Clear-To-Send (MU CTS) signaling between the AP and at least one wireless station (STA) 404,406. The AP sends a Request To Send (RTS) packet directed to multiple STAs. The RTS packet is indicating at least two STAs, to which the AP would like to transmit, and a configuration of a CTS packet to be used by said at least two STAs when responding to the RTS packet. The configuration enables the AP to identify the at least two STAs when the at least two STAs are transmitting a respective CTS packet. Further the AP receives, from at least one STA, a respective CTS packet transmitted in accordance with the indicated configuration, thereby enabling the AP to identify the at least one STA transmitting the respective CTS packet.

32 Claims, 5 Drawing Sheets

Method performed by STA 404,406

(51) Int. Cl.
*H04W 74/00* (2009.01)
*H04W 8/00* (2009.01)

(52) U.S. Cl.
CPC ....... *H04W 72/042* (2013.01); *H04W 74/006* (2013.01); *H04W 74/0816* (2013.01)

(56) References Cited

U.S. PATENT DOCUMENTS

| | | | |
|---|---|---|---|
| 2012/0147804 A1 | 6/2012 | Hedayat et al. | |
| 2013/0286959 A1 | 10/2013 | Lou et al. | |
| 2014/0328195 A1 | 11/2014 | Sampath et al. | |
| 2014/0341135 A1 | 11/2014 | Bhushan et al. | |
| 2015/0172011 A1* | 6/2015 | Aboul-Magd | H04L 5/0007 370/330 |
| 2015/0312386 A1* | 10/2015 | Lee | H04L 69/22 370/338 |
| 2015/0365972 A1* | 12/2015 | Seok | H04W 74/0816 370/336 |
| 2015/0373587 A1* | 12/2015 | Josiam | H04W 28/20 370/338 |
| 2016/0057736 A1* | 2/2016 | Jung | H04W 74/06 370/329 |
| 2016/0330047 A1* | 11/2016 | Seok | H04L 27/2602 |
| 2016/0360528 A1* | 12/2016 | Kim | H04W 74/0816 |
| 2017/0149547 A1* | 5/2017 | Kim | H04L 5/0055 |
| 2017/0302417 A1* | 10/2017 | Chun | H04L 5/0044 |

FOREIGN PATENT DOCUMENTS

| | | |
|---|---|---|
| WO | 2014179575 A2 | 11/2014 |
| WO | 2015096029 A1 | 7/2015 |

OTHER PUBLICATIONS

Yonggang, F. et al., "CSMA Enhancement Suggestion", doc.: IEEE 802.11-1410616, May 12, 2014, pp. 1-14.

\* cited by examiner

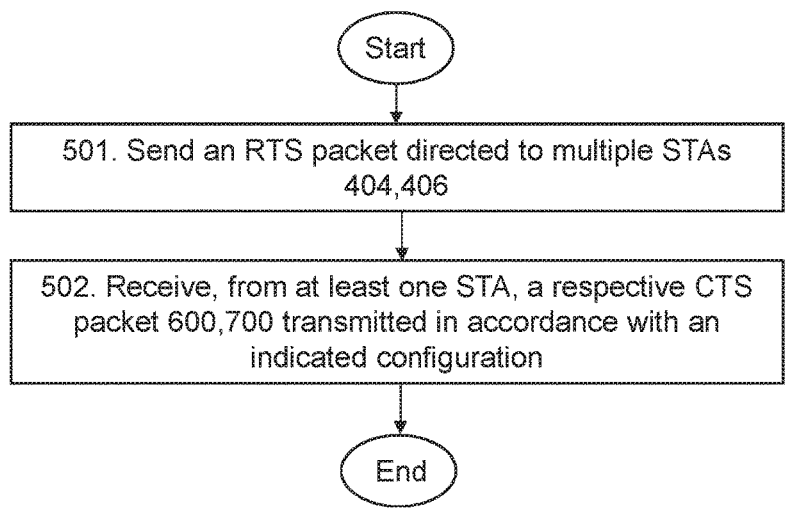
Figure 5 Method performed by AP 402
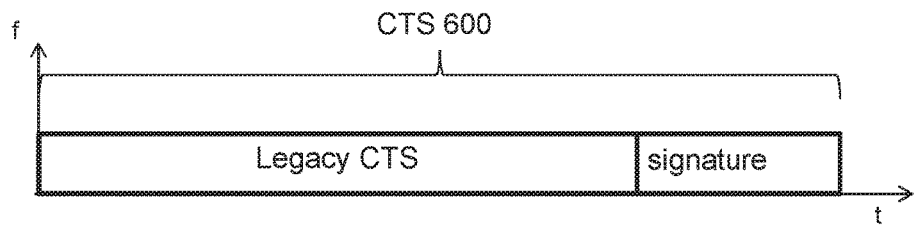
Figure 6

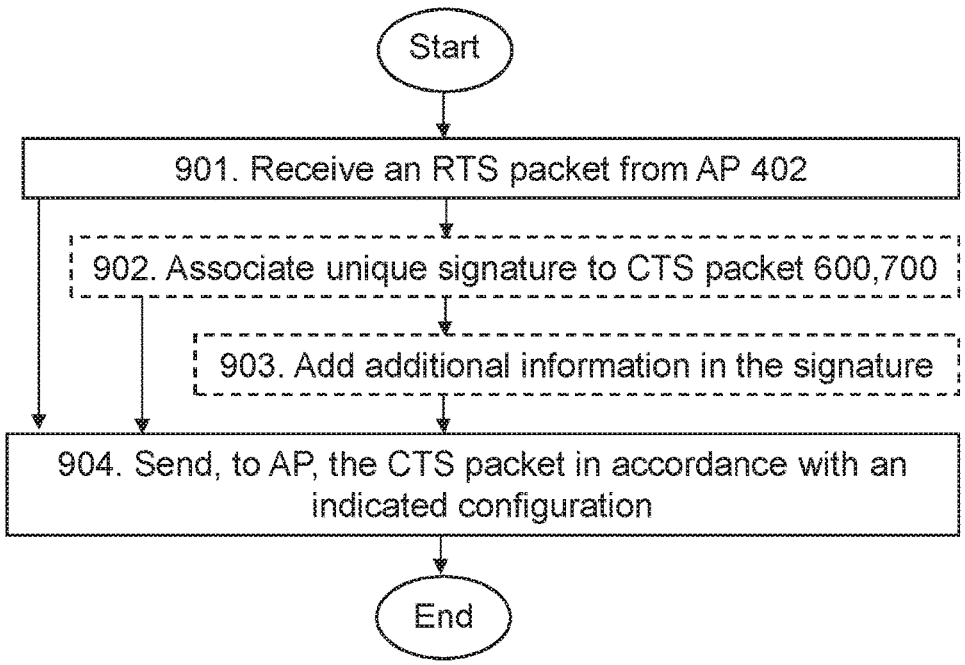
Figure 9 Method performed by STA 404,406
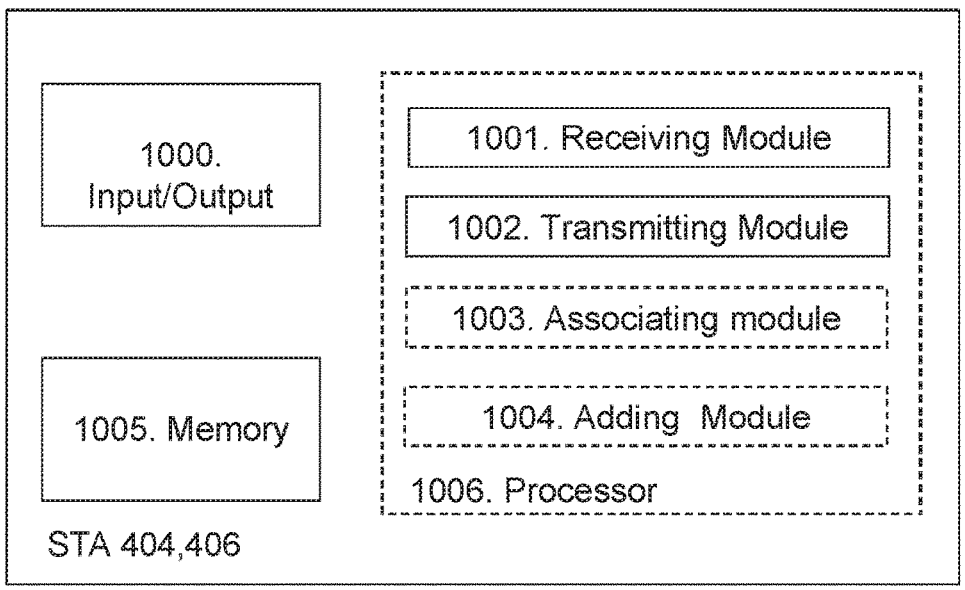
Figure 10

ACCESS POINT, A WIRELESS STATION AND METHODS THEREIN FOR MULTI-USER CLEAR TO SEND TRANSMISSIONS

TECHNICAL FIELD

Embodiments herein relate to an Access Point (AP), a wireless station (STA), and to methods therein. Especially, embodiments herein relate to Multi-User Clear-To-Send (MU CTS) signaling between the AP and at least one STA.

BACKGROUND

The Institute of Electrical and Electronics Engineers (IEEE) 802.11 is a set of Media Access Control (MAC) and PHYsical layer (PHY) specifications for implementing Wireless Local Area Network (WLAN) computer communication in the 2.4, 3.6, 5, and 60 GHz frequency bands. They are created and maintained by the IEEE Local Area Network (LAN)/Metropolitan Area Network (MAN) Standards Committee (IEEE 802), The base version of the standard was released in 1997, and has had subsequent amendments. The standard and amendments provide a local area wireless computer networking technology that allows electronic devices, e.g. an AP and a station (STA), to connect wirelessly to a network. A WLAN is sometimes referred to as a WiFi network.

In e.g. IEEE 802.11, the most commonly used channel access is distributed among the different stations (STAs). This means that a STA before a transmission needs to sense whether the channel is idle or busy, and only if the channel is found to be idle, a transmission can take place. This is a very simple approach, but still it does in many situations perform very well. This protocol is commonly known as Carrier Sense Multiple Access with Collision Avoidance (CSMA/CA). However, in order to work properly, the different STAs need to hear each other, e.g. they need to be located within radio coverage with each other. There are situations when e.g. two STAs connected to the same Access Point (AP) do not hear each other, as illustrated in FIG. 1. In this figure, a first STA, STA1, and a second STA, STA2, are both connected to the AP, but due to that the distance between the two STAs is large the second STA, STA2, cannot detect when the first STA STA1 is transmitting to the AR In the figure the circles are used to illustrate the respective coverage area, e.g. the respective radio coverage area, of the first STA, STA1, and the AP, respectively. This means that even if the first STA, STA1, is transmitting to the AP, the second STA, STA2, will not be able to detect this and therefore the second STA, STA2, may determine that the channel is idle and may therefore start its own transmission to the AP, which may cause a collision at the AP.

A Request-To-Send (RTS)/Clear-To-Send (CTS) procedure is a handshaking procedure. Before sending a packet, the transmitter, e.g. the AP, sends an RTS and waits for a OTS from the receiver, e.g. the STA. The reception of a CTS indicates that the receiver was able to receive the RTS, and that it is ready to receive data packet(-s) from the transmitter, i.e. the radio channel is clear in its area.

Further, the use of RTS and/or CTS is a means to prevent issues with Hidden Nodes (HN) and is described in e.g. IEEE 802.11, FIG. 1 schematically illustrates a hidden node problem according to the prior art, Referring to FIG. 1, when a first STA, STA1, senses, e.g. detects, the channel as being idle, it sends an RTS packet to an AP, and if the AP receives this it sends a CTS packet. A second STA, STA 2, cannot hear the RTS packet, as the first STA, STA1, is a HN for the second STA, STA2, but it can receive the CTS packet sent by the AP. The RTS and CTS packets comprise information about that the channel will be occupied for a certain amount of time, and thus the channel should not be accessed even if sensed idle. Thus, once the second STA, STA2, receives the CTS, it will effectively obtain information about that the first STA, STA1, will transmit to the AP and will during the time indicated in the CTS packet defer from transmitting.

Two things are worth pointing out. The first thing is that the use of RTS and/or CTS does not completely avoid the HN problem as there is a probability that the second STA, STA2, begins a transmission while the first STA, STA1, is sending the RTS packet. However, the RTS packet is typically much shorter than the actual data packet, so that the probability of a collision is significantly reduced. The second thing is that the use of RTS and/or CTS effectively means increased transmission overhead, and consequently reduced throughput.

Now, FIG. 1 and the discussion above illustrated the HN problem within one cell, often referred to as a Basic Service Set (BSS) in IEEE 802.11, and where the RTS/CTS was used to protect an Up-Link (UL) transmission. However, the HN problem may also occur in the Down-Link (DL), when e.g. STAs connected to another AP do not hear a DL transmission from the AP. This is illustrated in FIG. 2, where the first AP, AP1, cannot hear the transmissions that may occur from the second STA, STA2, to a second AP, AP2. In this case a first AP, AP1, may send an RTS to the first STA, STA1, which in turn may respond with a CTS. The second STA, STA2 will hear this CTS and will not initiate a transmission to the second AP, AP2, even if the channel is sensed being idle.

With the introduction of Multi-User (MU) transmission in the DL, the use of RTS and/or CTS may cause a significant overhead. Specifically, suppose that the AP is about to protect a DL transmission to four STAs STA1-STA4, as illustrated in FIG. 3. The AP then sends an RTS to the STAs STA1-STA4, and the STAs STA1-STA4 send the CTS back to the AP. This can be done in several ways. It is here assumed that only one RTS packet is sent, which addresses all STAs. However, how to send the CTS packets leaves more options. One may for instance be to let the STAs send the CTS one at time which will give detailed information about the channel conditions at each one of the STAs, but at the cost of a rather lengthy CTS transmission as there in this example will be four transmissions. This implies that such a solution does not scale well when the number of STAs grows.

US 2014/0341135 A1 to Bhushan et al. describes the signaling of RTS signals and CTS signals in an unlicensed spectrum. An eNB sends an RTS signal and the UEs named or served by the transmitting eNB send a common CTS signal a short time after the receipt of the RTS signal. The common CTS allows the UEs to grab the channel as quickly as possible. Further, the UEs identified by the transmitting eNB may send individual CTS signals staggered in time. The staggering may depend on the order in which the UEs are ready to receive data. Each of the individual CTS signals may comprise a MAC ID of the eNB transmitting the RTS signal and a MAC ID of the UE transmitting the individual CTS signal. A drawback with the staggering in time of the individual CTS signals is that the time period during which a CTS signal is valid is limited. For example, if the period of time between a first point in time when the first UE transmitted its individual CTS and a second point in time when the actual transmission from the eNB is to take place is too long, for example, due to the fact that other individual CTS signals staggered in time are to be received before the transmission can take place, the first UE may no longer experience a channel that is free. Thus, a transmission to that first UE will not be received by the first UE and will only increase the transmission overhead and thereby reduce the throughput. Further, the described staggered CTS signaling results in lengthy CTS transmissions, which as mentioned above, is not suitable when the number of UEs increase in the communications network.

In order to circumvent the potentially very high overhead with sequential CTSs, in IEEE 802.11-15/0867r1 (Po-Kai Huang, MU-RTS/CTS for DL MU) a method for simultaneous CTS transmission from different STAs to the AP has been proposed. As before, the RTS/CTS mechanism is used to protect against hidden nodes. However, now a more efficient RTSiCTS mechanism for protecting DL MU transmissions from the AP is proposed.

The mechanism is as follows. First, the AP transmits a MU-RTS frame which contains (among other fields) the addresses of the STAs that it wants to transmit to in the subsequent DL MU transmission. The STAs decode the MU-RTS, and only the ones that have their address listed in the MU-RTS frame respond with a CTS frame. In the new proposal, the CTS transmissions are transmitted simultaneously by all the STAs. Moreover, their content s exactly the same. Hence, as a result, this results in multiples copies of the same packet being received at the AP, from different paths and different delays. This is a typical multipath fading scenario that the AP knows how to handle. As a result, the transmission time of the CTS is minimized, since all the STAs transmit at the same time (in contrast to TDD in previous standards), and ensuring that the content is the same makes it easy to receive.

However, although the transmission time is minimized by simultaneously transmitting the same CTS packet, it has the drawback that the AP cannot detect which ones of the addressed STAs actually sent a CTS packet. The only thing the AP will be able to detect s whether at least one of the STAs sent a CTS packet. Therefore the AP may transmit its transmission to STAs not able to receive it. This can result in unnecessary transmissions causing increased transmission overhead and reduced throughput.

SUMMARY

Therefore, an object of embodiments herein is to address at least some of the above-mentioned drawbacks among others and to improve the performance in a wireless communications network.

According to an aspect of embodiments herein, a method is performed by an Access Point (AP) for Multi-User Clear-To-Send (MU CTS) signaling between the AP and at least one wireless station (STA).

The AP sends a Request-To-Send (RTS) packet directed to multiple STAs. The RTS packet is indicating at least two STAs, to which the AP would like to transmit.

Further, the RTS packet is indicating to the at least two STAs a configuration of a CTS packet to be used by at least two STAs when responding to the RTS packet. Thereby, the configuration enables the AP to identify the at least two STAs when the at least two STAs are transmitting a respective CTS packet.

Further, the AP receives, from at least one STA, a respective CTS packet transmitted in accordance with the indicated configuration, thereby enabling the AP to identify the at least one STA transmitting the respective CTS packet.

According to another aspect of embodiments herein an Access Point (AP) for Multi-User Clear-To-Send (MU CTS) signaling between the AP and at least one wireless station (STA) is provided.

The AP is configured to send a Request To Send (RTS) packet directed to multiple STAs, wherein the RTS packet is indicating at least two STAs, to which the AP would like to transmit. Further, the RTS packet is indicating to the at least two STAs a configuration of a Clear-To-Send (CTS) packet to be used by said at least two STAs when responding to the RTS packet. Thereby, the configuration enables the AP to identify the at least two STAs when the at least two STAs are transmitting a respective CTS packet.

Further, the AP is configured to receive, from at least one STA, a respective CTS packet transmitted in accordance with the indicated configuration, thereby enabling the AP to identify the at least one STA transmitting the respective CTS packet.

According to another aspect of embodiments herein, a method is performed by a wireless station (STA) for Multi-User Clear-To-Send (MU CTS) signaling between an Access Point (AP) and at least one wireless station (STA).

The STA receives a Request To Send (RTS) packet from the AP. The RTS packet is indicating to the STA, to which STAs the AP would like to transmit. Further, the RTS packet is indicating to the STA a configuration of a CTS packet to be used by said at least two STAs when responding to the RTS packet. Thereby, the configuration enables the AP to identify the at least two STAs when the at least two STAs are transmitting the CTS packets.

Further, the STA sends, to the AP, a CTS packet in accordance with the indicated configuration, thereby enabling the AP to identify the STA.

According to another aspect of embodiments herein, a wireless station (STA) for Multi-User Clear-To-Send (MU CTS) signaling between an Access Point (AP) and at least one wireless station (STA) is provided.

The STA is configured to receive a Request To Send (RTS) packet from the AP. The RTS packet is indicating to the STA, to which STAs the AP would like to transmit; and wherein the RTS packet further is indicating to the STA a configuration of a Clear To Send (CTS) packet to be used by said at least two STAs when responding to the RTS packet. Thereby, the configuration enables the AP to identify the at least two STAs when the at least two STAs are transmitting the CTS packets.

Further, the STA sends, to the AP, a CTS packet in accordance with the indicated configuration, thereby enabling the AP to identify the STA.

According to another aspect of embodiments herein, a computer program comprising instructions which, when executed on at least one processor, causes the at least one processor to carry out the method performed by the AP is provided.

According to another aspect of embodiments herein, a computer program comprising instructions which, when executed on at least one processor, causes the at least one processor to carry out the method performed by the STA is provided.

Since the AP is configured to send, to the at least two STAs, the RTS packet indicating to which STAs the AP would like to transmit, and since the RTS packet is indicating to the at least two STAs a configuration of a CTS packet to be used by said at least two STAs when responding to the RTS packet, the AP is able to identify the STA when transmitting a respective CTS packet. Thus, before transmitting its transmission the AP will have knowledge about which STAs are able to receive the transmission, and therefore the AP may only transmit the transmission to those STAs. This results in an improved performance in the wireless communications network.

An advantage with embodiments herein is that a data transmission from the AP to the at least two STAs to which the RTS was sent is only made to those STAs able to receive the RTS and not necessarily to all STAs to which the RTS was sent. Thereby, the transmission overhead in the wireless communications network is reduced and consequently the throughput in the wireless communications network may be increased.

Another advantage with embodiments herein is that effectively more users, e.g. more STAs, may be supported, as the risk for part of the channel bandwidth being unused is reduced.

BRIEF DESCRIPTION OF DRAWINGS

Examples of embodiments herein will be described in more detail with reference to attached drawings in which:

FIG. 5 is a flowchart depicting embodiments of a method performed by an AP;

FIG. 6 schematically illustrates a first exemplifying embodiment of a CTS packet;

FIG. 9 is a flowchart depicting embodiments of a method performed by a STA; and

FIG. 10 is a schematic block diagram illustrating embodiments of a STA;

DETAILED DESCRIPTION

As part of developing embodiments herein, some problems with the state of the art wireless communications networks will first be identified and discussed.

A problem to be solved by embodiments disclosed herein is the problem with the above-described approach that the AP will not know which STAs didn't receive a MU-RTS, i.e. a transmission of a RTS packet to a plurality of STAs, properly. Since all STAs transmit exactly the same information at the same time, there is no difference between STAs that received the MU-RTS properly or the ones that did not receive it. The AP will only be able to distinguish between the case that no one received the MU-RTS (in that case no CTS is sent back from any STA) or that at least one STA received it.

Figure 1:
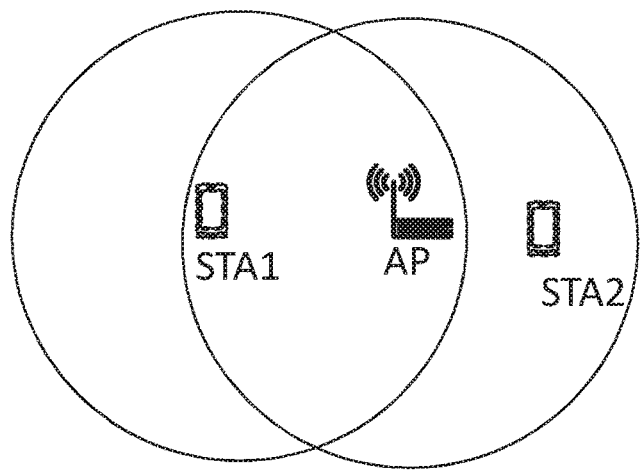
FIG. 1 schematically illustrates the hidden node problem according to prior art.
Figure 2:
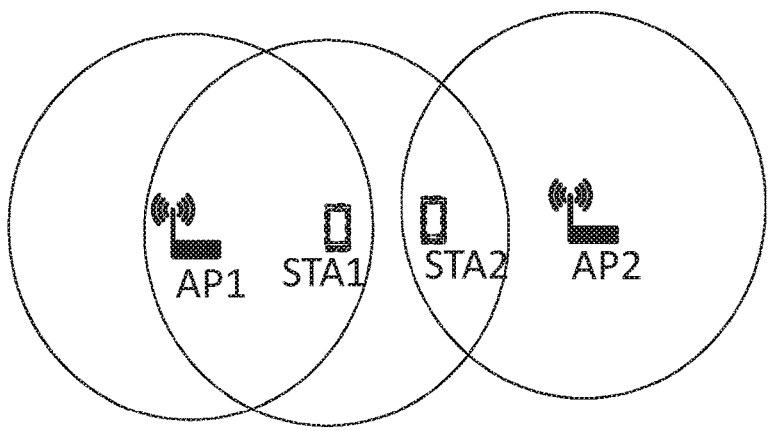
FIG. 2 schematically illustrates the hidden node problem in case of a downlink transmission according to prior art.
Figure 3:
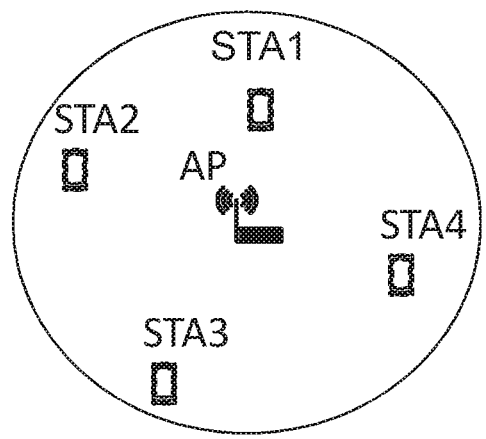
FIG. 3 schematically illustrates downlink transmission to four STAs according to prior art.

Clearly, the problem caused by not being able to know which STAs received the MU-RTS is that there might be hidden nodes that are not detected. Namely, say that only the STA STA1 in FIG. 3 is able to correctly decode the MU-RTS, while the STAs STA2, STA3 and STA4 are unable to decode it due to some ongoing interference from other STAs. According to the proposed technique, the AP will still receive a CTS from the STA STA1, and subsequently transmit DL data to the STAs STA1, STA2, STA3 and STA4. This can then result in that STAs STA2, STA3 and STA4 are not being able to receive their data, with only the STA STA1 being able to decode its own data. Hence, there was a "waste" of bandwidth in this case, since the data transmissions to the STAs STA2, STA3 and STA4 were effectively doomed to be unsuccessful from the start. If the AP would know that only the STA STA1 received the CTS, it could utilize the remaining bandwidth in a more efficient way, e.g. by giving the STA STA1 more bandwidth Embodiments herein relate to methods for detecting wireless terminals or stations, STAs, in an IEEE 802.11 environment (WiFi, WLAN) that received a multi-user request to send, MU-RTS, correctly, and associated clear to send, CTS, signaling. The methods enable a base station/access point, AP, to detect which STAs that actually transmit the CTS after a MU-RTS.

According to embodiments herein, different methods for detecting the STAs that have received MU-RTS correctly are provided. In addition, other STAs, e.g. legacy STAs that may be hidden from the AP, are still able to decode the CTS, and may in fact not notice that different STAs transmit slightly different CTS packets. Moreover, some of the methods may also infer about the STAs conditions, e.g. if it is heavily interfered even though the MU-RTS is received.

Thus, some embodiments herein are able to detect which STAs that actually transmit the CTS after a MU-RTS. This enables the AP to decide how data should be transmitted in the subsequent downlink transmission. As explained above, this may significantly increase the system throughput.

In this disclosure the terms "RTS" and "RTS packet" are used interchangeably, and the terms "CTS" and "CTS packet" are used interchangeably. Further, it should be understood that an RTS packet transmitted to at least two STAs may be referred to as an MU-RTS packet or an MU-RTS. Furthermore, the CTS packet is sometimes in this disclosure referred to as a CTS response or to as a CTS message.

In the following section, embodiments herein will be illustrated in more detail by various exemplary embodiments. It should be noted that these embodiments are not mutually exclusive. Components from one embodiment may be assumed to be present in another embodiment and it will be obvious to a person skilled in the art how those components may be used in the other exemplary embodiments.

Some embodiments herein are exemplified with reference to Multi User transmissions (MU transmissions) in relation to Orthogonal Frequency-Division Multiplexing Access (OFDMA). However it should be understood that embodiments herein may also be applicable to UL MU Multiple Input and Multiple Output (MIMO) transmissions.

Figure 4:
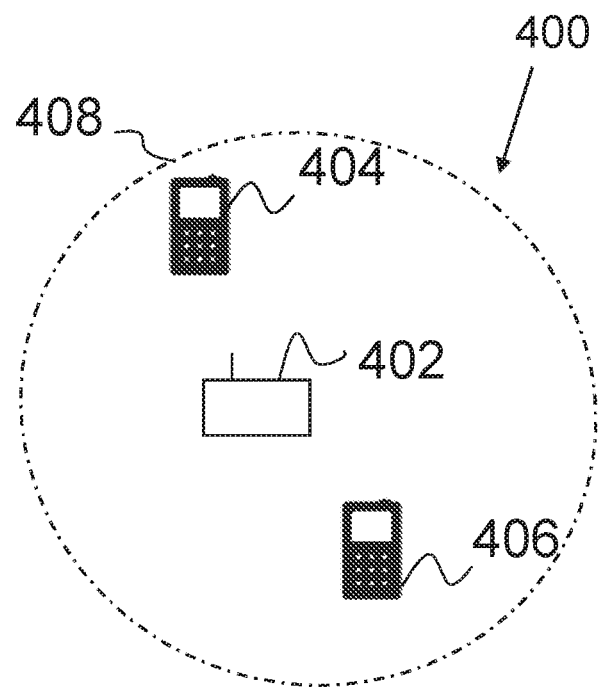
FIG. 4 schematically illustrates an embodiment of a wireless communications network.

FIG. 4 depicts an example of a communications network 400 in which embodiments herein may be implemented. The communications network 400 is a wireless communications network such as a Carrier Sense Multiple Access (CSMA) based communications network, or a communications network that deploy some kind of RTS/CTS scheme. However, the communications network 400 may be another type of communications network having CSMA or CSMA-like access employing schemes that are similar to RTS/CTS schemes. Thus, it may be a WLAN, an LTE network, a Wideband Code Division Multiple Access (WCDMA) network, a Global System for Mobile Communications (GSM) network, any 3GPP cellular network, Worldwide Interoperability for Microwave Access (WiMAX) network, any other wireless network having CSMA or CSMA-like access employing schemes that are similar to RTS/CTS Schemes, or a combination of one or more of the aforementioned communications networks.

An Access Point (AP) 402 is comprised in the communications network 400. The AP 402 is configured to operate in the communications network 400. In other words, the AP 402 is operable in the communications network 400.

The AP 402 may be a wireless access node, such as a WLAN access node or a radio access node. The radio access node may be a radio base station, for example an eNB, i.e. an eNodeB, or a Home Node B, an Home eNode B or any other network node capable to serve and/or communicate with a communications device, such as a STA, in the communications network 400.

Sometimes in this disclosure, the AP 402 is referred to as a first network node.

At least two wireless stations (STAs) 404, 406 are comprised in the communications network 400. The STAs 404,406 are sometimes in this disclosure referred to as communications devices, such as a first and a second communications device, or first and second STAs. The STAs 404,406 are configured to operate in the communications network 400. In other words, the STAs 404,406 are operable in the communications network 400.

Sometimes in this disclosure, the STAs 404,406 are referred to as a second network node and a third network node, respectively.

It should be understood that the network nodes, e.g. the first, second, and third network node 402,404,406, may be configured to both transmit and receive a transmission such as a signal. However, in this disclosure at least one of these nodes is transmitting the signal and at least one of the other nodes is receiving the signal. Thus, they may be referred to as a transmitting node, e.g. a transmitter, and a receiving node, e.g. a receiver, respectively. Further, at least one of the network nodes is configured to schedule uplink resources for at least one of the other nodes. For example, the first network node 402 may be configured to schedule resources for uplink transmission from the second or third network nodes 404, 406 to the first network node 402.

Further, two or more network nodes, e.g. two or more of the first, second and third network nodes, are configured for wireless communication with each other, when being located within a geographical area 408 served by one of the network nodes, e.g. the first network node, such as the AP 402, having radio coverage within the geographical area 408. Herein, this is also specified as the AP 402 manages or is configured to manage communication with the STAs 404,406 in the geographical area 408. The geographical area 408 may be determined as the area where communication between the network nodes are possible, given one or more constraints on, e.g., output power, required data rate and similar. In this disclosure, the geographical area 408 is sometimes also referred to as a coverage area, a cell or a cluster. Further, the STAs 404,406 belongs to the same Basic Service Set (BSS). The BSS may possibly also comprise the one or more further STAs.

An example of a method performed by the AP 402 for Multi-User Clear-To-Send (MU CTS) signaling between the AP 402 and at least one wireless station (STA) 404,406 will now be described with reference to a flowchart illustrated in FIG. 5. As mentioned above, the AP 402 and at least two STAs 404,406 are operating in the communications network 400.

Action 501

When the AP 402 has a transmission to be made, the AP 402 sends a Request To Send (RTS) packet directed to multiple STAs 404,406. As previously mentioned, the RTS packet may be a MU RTS packet. The AP 402 may typically send the RTS packet when the AP 402 has a transmission to be transmitted to at least two STAs 404,406 and when the AP 402 wants to determine which STAs 404,406 are able to receive the transmission and thus to which STAs 404,406 the transmission should be transmitted and how the transmission should be transmitted.

The RTS packet is indicating at least two STAs 404,406, to which the AP would like to transmit. For example, the RTS packet may indicate that a plurality of STAs, e.g. more STAs than the at least two STAs 404,406, are about to receive the packet. Further, the RTS packet is indicating to the at least two STAs 404,406 a configuration of a Clear To Send (CTS) packet to be used by said at least two STAs 404,406 when responding to the RTS packet. Thereby, the configuration enables the AP 402 to identify the at least two STAs 404,406 when the at least two STAs 404,406 are transmitting a respective CTS packet.

In some embodiments, the configuration involves assigning a unique signature to be sent in association with the CTS packet, wherein the unique signature comprises a signature sequence uniquely allocated for the respective STAs 404, 406. By assigning a unique signature to each STA, the AP 402 is enabled to identify the STA transmitting the CTS packet in response to the RTS packet transmitted by the AP 402, The signature sequences allocated for different STAs may be orthogonal to one another.

FIG. 6 schematically illustrates some first exemplifying embodiments of a CTS packet 600 for a STA, e.g. the STA 404, wherein the signature is appended at the end of a legacy CTS packet. That is, a first part of the CTS packet 600 comprises the legacy CTS packet and a second part of the CTS packet 600 comprises the signature. Thereby, the CTS packet 600 and thus the CTS transmission are augmented in time.

Further, different STAs may be allocated to different sub-carriers.

The different STAs may be allocated to different sub-carriers by adding a single Orthogonal Frequency-Division Multiplexing (OFDM) symbol and e.g. using differential encoding based on the phase difference between different sub-carriers or simple of-off keying, i.e., something is sent on the assigned sub-carrier if the RTS is received so that the AP can detect what STAs has sent a CTS by identifying what sub-carriers in the added OFDM symbol are used. Furthermore, the different STAs may be allocated to different consecutive OFDM symbols.

Figure 7:
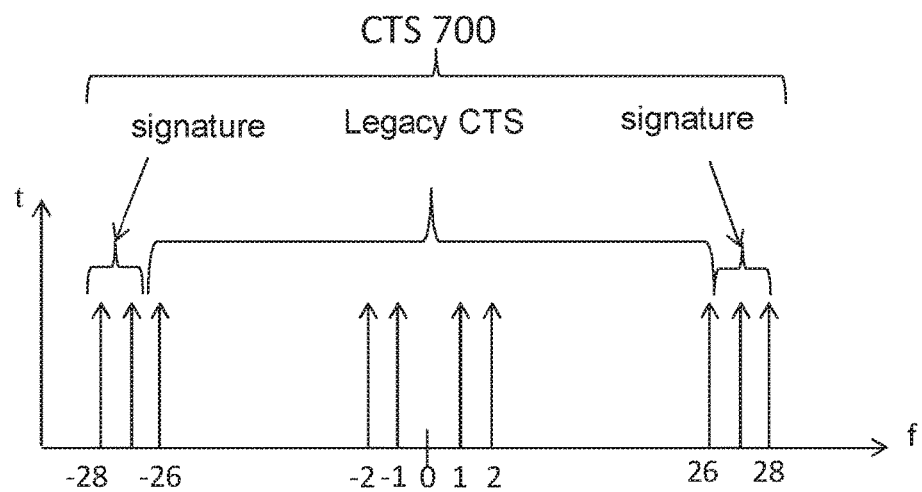
FIG. 7 schematically illustrates a second exemplifying embodiment of a CTS packet.

FIG. 7 schematically illustrates some second exemplifying embodiments of a CTS packet 700 for a STA, e.g. the STA 404, wherein the signature is sent using one or more additional sub-carriers not used for the legacy CTS packet. That is, a first part of the CTS packet 700 comprising the legacy CTS packet is transmitted using the legacy sub-carriers and a second part of the CTS packet 700 comprising the signature is transmitted using the one or more additional sub-carriers not used for transmitting the legacy CTS packet. As illustrated in FIG. 7, the second part of the CTS packet 700 comprising the signature may be transmitted using sub-carriers on either side of the sub-carriers used for transmitting the legacy CTS packet. Thus, the second part may be divided into two sub-parts, wherein the sub-parts may be transmitted using one or more sub-carriers on both sides of the sub-carriers used for transmitting the legacy CTS packet. Thereby, the CTS packet 700 and thus the CTS transmission are augmented in frequency.

Alternatively or additionally, according to some second embodiments, different sets of sub-carriers are allocated to different STAs. In other words, the different STAs are allocated different sets of sub-carriers.

Action 502

The AP 402 receives, from at least one STA 404,406, a respective CTS packet transmitted in accordance with the indicated configuration. For example, the respective CTS packet may comprise the uniquely assigned signature. Thereby, enabling the AP 402 to identify the at least one STA 404,406 transmitting the respective CTS packet.

Once the AP 402 has identified each one of the at least one STAs 404,406, the AP 402 may determine how to transmit the transmission, e.g. the downlink transmission, to each one of the identified at least one STAs 404,406. Thereafter, the AP 402 may transmit the transmission to each one of the identified at least one STAs 404,406 in accordance with the determination. Thus, the AP 402 will transmit the transmission only to those STAs able to receive it, thereby reducing the transmission overhead and increasing the throughput in the communications network 200.

Figure 8:
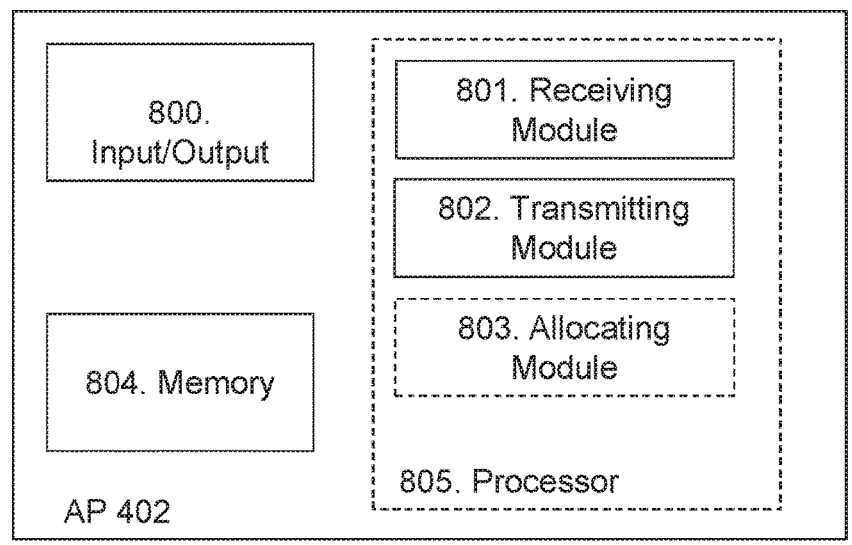
FIG. 8 is a schematic block diagram illustrating embodiments of an AP.

To perform the method for MU CTS signaling between the AP 402 and the at least two STAs 404,406, the AP 402 may be configured according to an arrangement depicted in FIG. 8. As mentioned above, the AP 402 and the at least two STAs 404,406 are operating in the communications network 400.

In some embodiments, the AP 402 comprises an input and output interface 800 configured to communicate with one or more the network nodes e.g. the first and second STAs 404,406. The input and output interface 800 may comprise a wireless receiver (not shown) and a wireless transmitter (not shown).

The AP 402 is configured to receive, e.g. by means of a receiving module 801 configured to receive, a respective CTS packet from at least two STAs 404,406. The receiving module 801 may be implemented by or arranged in communication with a processor 805 of the AP 402. The processor 805 will be described in more detail below.

Especially, the AP 402 is configured to receive, from at least one STA 404,406, a respective CTS packet transmitted in accordance with an indicated configuration. Thereby enabling the AP 402 to identify the at least one STA 404,406 transmitting the respective CTS packet.

The AP 402 is configured to transmit, e.g. by means of a transmitting module 802 configured to transmit, an RTS packet directed to multiple STAs 404,406. In other words, the AP 402 is configured to send the RTS packet to the multiple STAs 404,406. The transmitting module 802 may be implemented by or arranged in communication with the processor 805 of the AP 402.

The RTS packet is configured to indicate to at least two STAs 404,406, to which the AP would like to transmit. It should be understood that the AP 402 may intend to transmit a transmission to a plurality of STAs and thus to more than the at least two STAs 404,406. Therefore, more than the at least two STAs 404,406 may be intended recipients of the transmission.

Further, RTS packet is configured to indicate to at least two STAs 404,406 a configuration of a CTS packet to be used by said at least two STAs 404,406 when responding to the RTS packet. The configuration enables the AP 402 to identify the respective one of the at least two STAs 404,406 when the at least two STAs 404,406 are transmitting a respective CTS packet.

In some embodiments, the configuration involves assigning a unique signature to be sent in association with the CTS packet, wherein the unique signature comprises a signature sequence uniquely allocated for the respective STAs 404, 406.

The signature sequences allocated for different STAs may be orthogonal to one another. Thereby providing uniqueness of the signature sequences allocated for the different STAs.

As previously mentioned, different STAs may be allocated to different sub-carriers. Further, the different STAs may be allocated to different sub-carriers by adding a single OFDM symbol and using differential encoding based on the phase difference between different sub-carriers. Furthermore, the different STAs may be allocated to different consecutive OFDM symbols.

As also previously mentioned, alternatively or additionally, different sets of sub-carriers are allocated to different STAs. In other words, the different STAs are allocated different sets of sub-carriers.

The AP 402 may be configured to allocate, e.g. by means of an allocating module 803 configured to allocate, the unique signature to the respective STA 404,406. The allocating module 803 may be implemented by or arranged in communication with the processor 805 of the AP 402.

The allocating module 803 may further be configured to allocate different cub-carriers or different sets of sub-carriers to the respective STAs 404,406.

The AP 402 may also comprise means for storing data. In some embodiments, the AP 402 comprises a memory 804 configured to store the data. The data may be processed or non-processed data and/or information relating thereto. The memory 804 may comprise one or more memory units. Further, the memory 804 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the AP 402.

Embodiments herein for MU CTS signaling between the AP 402 and the at least one STA 404,406 may be implemented through one or more processors, such as the processor 805 in the arrangement depicted in FIG. 8, together with computer program code for performing the functions and/or method actions of embodiments herein. The program code mentioned above may also be provided as a computer program product, for instance in the form of a data carrier carrying computer program code for performing the embodiments herein when being loaded into the AP 402. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the AP 402.

Those skilled in the art will also appreciate that the input/output interface 800, the receiving module 801, the transmitting module 802, and the allocating module 803 above may refer to a combination of analog and digital circuits, and/or one or more processors configured with software and/or firmware, e.g. stored in the memory 804, that when executed by the one or more processors such as the processors in the AP 402 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

An example of a method performed by the wireless STA 404 for Multi-User Clear-To-Send (MU CTS) signaling between the AP 402 and at least one STA 404,406 will now be described with reference to a flowchart illustrated in FIG. 9. As mentioned above, the AP 402 and at least two STAs 404,406 are operating in the communications network 400. It should be understood that the method performed by the first STA 404 and described herein may be performed by the second STA 406 and thus the actions described below are equally applicable to the second STA 406.

Action 901

The STA 404 receives an RTS packet from the AP 402. The RTS packet is indicating to the STA 404, to which STAs the AP 402 would like to transmit. Further, the RTS packet is indicating, to the STA 404, a configuration of a CTS packet 600,700 to be used by said at least two STAs 404,406 when responding to the RTS packet. The configuration enables the AP 402 to identify the respective one of the at least two STAs 404,406 when the at least two STAs 404,406 are transmitting the CTS packets 600,700.

Action 902

In some embodiments, the STA 404 associates a unique signature with the CTS packet 600,700. The unique signature may comprise a signature sequence uniquely allocated for the STA 404.

As previously described, the unique signature may be allocated by the AP 402 and it may be comprised in the configuration received in the RTS packet transmitted from the AP 402.

As previously described with reference to FIG. 6, and in accordance with some first exemplifying embodiments, the STA 404 may associate the unique signature with the CTS packet 600 by augmenting the CTS packet 600 in time by adding the signature to a common part of the CTS packet. The common part of the CTS packet may comprise a legacy CTS packet as schematically illustrated in FIG. 6.

In some embodiments, the STA 404 adds the signature after a common part of the CTS packet. Thereby, enabling the common part of the CTS packet to be read also by a legacy AP that is able to read only the common part.

The STA 404 may introduce a gap (not shown in FIG. 6) between the common part of the CTS packet and a signature part comprising the unique signature. The gap may have a gap length corresponding to a Short InterFrame Space (SIFS) or a Reduced InterFrame Space (RIFS). The gap may stop a legacy AP from trying to continue reading the CTS packet when it has read the common part.

For example, the SIFS is the amount of time in micro seconds required for a wireless interface to process a received frame and to respond with a response frame, and the RIFS is the time in micro seconds by which multiple transmissions from a single station is separated.

As previously described with reference to FIG. 7, and in accordance with some second exemplifying embodiments, the STA 404 may associate the unique signature with the CTS packet 700 by augmenting the CTS packet in frequency by adding subcarriers to a common part of the CTS packet. This is schematically illustrated in FIG. 7.

Action 903

In some embodiments, the STA 404 adds additional information in the signature, such as the interference strength, and/or Modulation Coding Scheme (MCS) information.

Action 904

The STA 404 sends, to the AP 402, a CTS packet 600,700 in accordance with the indicated configuration, thereby enabling the AP 402 to identify the STA 404.

To perform the method for MU CTS signaling between the AP 402 and the at least two STAs 404,406, the STA 404 may be configured according to an arrangement depicted in FIG. 10. As mentioned above, the AP 402 and the at least two STAs 404,406 are operating in the communications network 400. It should be understood that the second STA 406 may be configured in accordance with the first STA 404, and thus the description below referring to the first STA 404 is equally applicable to the second STA 406.

In some embodiments, the STA 404 comprises an input and output interface 1000 configured to communicate with one or more the network nodes e.g. the AP 402 and the second STA 406. The input and output interface 1000 may comprise a wireless receiver (not shown) and a wireless transmitter (not shown).

The STA 404 is configured to receive, by means of a receiving module 1001 configured to receive, a RTS packet from the AP 402. The receiving module 1001 may be implemented by or arranged in communication with a processor 1006 of the STA 404. The processor 1006 will be described in more detail below.

The RTS packet is configured to indicate to the STA 404, to which STAs the AP 402 would like to transmit. Further, the RTS packet is configured to indicate to the STA 404 a configuration of a CTS packet 600,700 to be used by said at least two STAs 404,406 when responding to the RTS packet, wherein the configuration enable the AP 402 to identify the respective one of the at least two STAs 404,406 when the at least two STAs 404,406 are transmitting the respective CTS packet 600,700.

The STA 404 is configured to transmit, by means of a transmitting module 1002 configured to transmit, to the AP 402, a CTS packet 600,700 in accordance with the indicated configuration, thereby enabling the AP 402 to identify the STA 404. The transmitting module 1002 may be implemented by or arranged in communication with the processor 1006 of the STA 404.

The STA 404 may be configured to associate, by means of an associating module 1003 configured to associate, a unique signature with the CTS packet 600,700. The associating module 1003 may be implemented by or arranged in communication with the processor 1006 of the STA 404.

The unique signature comprises a signature sequence uniquely allocated for the STA 404.

In some first embodiments, the STA 404 is configured to associate the unique signature with the CTS packet 600 by augmenting the CTS packet 600 in time by adding the signature to a common part of the CTS packet.

For example, the signature may be added after a common part of the CTS packet 600.

In some embodiments, a gap is introduced between the common part of the CTS packet and a signature part comprising the unique signature. The gap may have a gap length corresponding to a SIFS, or an RIFS.

In some second embodiments, the STA 404 is configured to associate the signature with the CTS packet 700 by augmenting the CTS packet 700 in frequency by adding subcarriers to a common part of the CTS packet.

The STA 404 may be configured add, by means of an adding module 1004 configured to add, additional information in the signature. The adding module 1004 may be implemented by or arranged in communication with the processor 1006 of the STA 404.

The additional information may be interference strength, and/or a Modulation Coding Scheme, MCS, information.

The STA 404 may also comprise means for storing data. In some embodiments, the STA 404 comprises a memory 1005 configured to store the data. The data may be processed or non-processed data and/or information relating thereto. The memory 1005 may comprise one or more memory units. Further, the memory 1005 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the STA 404.

Embodiments herein for MU CTS signaling between the AP 402 and the at least one STA 404,406 may be implemented through one or more processors, such as the processor 1006 in the arrangement depicted in FIG. 10, together with computer program code for performing the functions and/or method actions of embodiments herein. The program code mentioned above may also be provided as a computer program product, for instance in the form of a data carrier carrying computer program code for performing the embodiments herein when being loaded into the STA 404. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the STA 404.

Those skilled in the art will also appreciate that the input/output interface 1000, the receiving module 1001, the transmitting module 1002, the associating module 1003, and the adding module 1004 above may refer to a combination of analog and digital circuits, and/or one or more processors configured with software and/or firmware, e.g. stored in the memory 1005, that when executed by the one or more processors such as the processors in the STA 404 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Below two exemplifying embodiments will be described. For example, it will be described how to send the CTS 600,700 in a way such that the AP 402 may distinguish, e.g. determine, from which STAs 404,406 it was sent. The exemplifying embodiments relate to Actions 501 and 502, and to Actions 901-904 previously described. It will be assumed that the MU-RTS contains, e.g. comprises, information about the STAs that are expected to transmit a CTS, in a similar fashion as a Trigger frame would contain information about the STAs that are scheduled for UL transmission. Exactly how this information is signaled is not important and the embodiments disclosed herein are applicable regardless of the signaling of the information.

One example of how the different STAs may be notified is by explicitly, in the MU-RTS frame, e.g. in the MU-RTS packet, indicate each STA that is expected to respond with a CTS.

Another example is to group different STAs together, and then signal what group is expected to respond.

Furthermore, the specific allocation of resources to use in the CTS for the different STAs may also be allocated in various ways. In one example, it may be specified explicitly for each one of the addressed STAs in the MU-RTS. In another example it may be signaled beforehand to the different STAs such that when addressed in a MU-RTS, it knows what resources to use. This latter example may e.g. be used in case there are a small number of STAs such that the number of available resources suffices. Alternatively, the resources may be given to the STAs such that more than one STA may be assigned the same resources for transmitting, and in this case the AP will keep track of this and not send MU-RTS to two STAs with the same assigned resource.

Some Exemplifying First Embodiments Relating to CTS Transmission Augmented in Time Embodiments herein provide a remedy to the CTS ambiguity in the proposal mentioned in the background section above by augmenting the CTS packet with a short signature, which is unique for each one of the addressed STAs. According to embodiments disclosed herein, the short signature may be comprised in a second part of the CTS as will be described below. The first part of the packets sent from the different STAs is identical and common for all STAs, benefiting from the properties explained in the proposal. This means that that the AP 402 may detect whether at least one of the STAs has sent a CTS. At the same time, other STAs, that are supposed not to access the channel due to the CTS packet may read this and defer.

However, in order to be able to identify which STAs actually transmitted a CTS 600, and according to embodiments disclosed herein, a unique second part including a signature sequence, e.g. the short signature mentioned above, is added after the common part of the CTS, i.e. the legacy CTS, as illustrated in FIG. 6. A legacy STA that receives the CTS packet 600 will identify it as a CTS packet and simply stop processing at the end of the common CTS part of the packet, and therefore defer properly. The AP 402, on the other hand, will also process the signature part of the CTS packet 600 in order to determine what STAs actually transmitted the CTS packet 600.

The basic idea is that upon receiving the composite signal from a number of STAs, the AP 402 is able to determine exactly the STAs that are transmitting. Preferably the signature sequences are orthogonal to one another. Orthogonality may be achieved in many ways. One example is that different STAs 404,406 are allocated to different sub-carriers. This may be the preferred way as a relatively large number of STAs may be supported by just adding a single OFDM symbol. Another example is that different STAs 404,406 are allocated to different consecutive OFDM symbols.

As the first part of the CTS packet 600, i.e., the legacy CTS part, is potentially transmitted by several users, i.e. by several STAs, it is not suitable for estimating the channel from individual STAs. Therefore, the signature sequence should preferably allow for decoding without the need for channel estimation. As an example covered by the present disclosure, the signature sequence may be differentially encoded. In particular in case the STAs are made orthogonal by allocating them to different sub-carriers, the differential encoding may be based on the phase difference between different sub-carriers. As another example of a modulation that do not require channel estimation is on-off keying, i.e., some data is sent to denote that a STA, e.g. the STA 404, is transmitting the CTS, but it is not important what is actually sent.

As the CTS packet 600 effectively only contains one single bit of information, whether the signal is present or absent, and the number of bits possible to transmit in the signature most likely may be, say, at least 8, it is also possible to include additional information in the signature message. Namely, it could report about the interference strength, which MCS it is able to receive, etc. Hence, this enables more freedom for each STA 404,406.

A minor trade-off with this embodiment is that each CTS transmission will take slightly longer time, since at least one additional OFDM symbol is used for the signature. However, this is envisioned to be doable, since the future 802.11ax standard will support UL OFDMA, and since the additional overhead incurred by this is well compensated by the benefits of each STA 404,406 being able to signal more to the AP 402.

Using different sub-channels for different STAs' UL transmission may be done in several ways allowing the AP 402 to identify which one of the STAs 404,406 has actually transmitted. However, as the reason for sending the CTS 600 is to inform other STAs (apart from the AP 402 sending the RTS) that the channel will be occupied, it is essential that the CTS message may be decoded by these STAs. Thus, a first, common, part of the CTS 600 may be sent over the full bandwidth by all STAs as indicated by the AP 402 in the RTS, such that other STAs can read this and properly defer from accessing the channel. A second, unique, part of the CTS 600, following the first part, including the signature and possible information unique to a STA, is then sent using OFDMA where different STAs are using different sub-channels.

In FIG. 6, the signature sequence is illustrated as following immediately after the legacy CTS packet. As previously mentioned, the CTS packet 600 has a first part comprising the legacy CTS and a second part comprising the signature. The embodiment also covers the situation that a small gap would be introduced between the common legacy CTS part and the signature part. This is to secure that legacy STA's are not continuing to decode new information fields that they cannot interpret. Preferably such a gap should be small, e.g. a short interframe space (SIFS) or a reduced interframe space (RIFS).

Because the CTS responses, i.e. CTS packets 600, will be from STAs located at different distances from the AP 402, the CTS responses may typically not be perfectly time aligned. However, as long as the legacy part of the CTS response may be correctly received even if received with different delays from the different STAs, there is no problem to design signature sequences that also will be easily detectable.

Note that the problem that is solved with some embodiments disclosed herein relates to sending a MU-RTS to several STAs 404,406, and being able to identify which ones of the STAs actually send the CTS and which do not. Another problem relates to identifying what STAs sends in the UL is when several STAs potentially may do random access simultaneously. The solution presented herein differs from solutions related to random access in several important aspects. Firstly, explicit, preferably orthogonal, resources are assigned to the different STAs, preferably in the preceding frame. Secondly, one part of the sent UL packets from the different STAs is identical to support backward compatibility with legacy devices. Random access is typically introduced for a new system and do not have any concern with legacy support. Thirdly, in case of random access, the UL is by definition not scheduled.

Some Second Exemplifying Embodiments Relating to CTS Transmission Augmented in Frequency In some second exemplifying embodiments, the legacy CTS transmission is augmented in frequency rather than in time. Suppose that the legacy CTS packet is transmitted using 52 sub-carriers, as illustrated in FIG. 7. The signature according to this embodiment is sent by allocating additional sub-carriers, e.g. in a similar way as was done in 802.11n compared to 802.11g where 4 additional sub-carriers were added.

When this embodiment is used, a legacy STA will simply just process the 52 sub-carriers of a basic common CTS packet, i.e. the legacy CTS without added signature, and detect the presence of the CTS packet. The AP 402, on the other hand, will also process the additional sub-carriers and in this way determine what STAs have actually transmitted the CTS packet 700. Compared to some first embodiments wherein the augmentation was in time, some second embodiments do not cause any addition time for transmitting the augmented CTS packet 700. The trade-off in this case is a slight reduction in the power of the common legacy CTS part, as the total available power now has to be shared with the sub-carriers when added for the signature.

Similar to some first embodiments, the signature sequences allocated to the different STAs 404,406 are preferably made orthogonal to one another. This may be done in many different ways by allocating different sets of sub-carriers to different STAs 404,406. As one example, each STA 404,406 may be allocated all signature sub-carriers for a specific OFDM symbol. Referring to FIG. 4 and FIG. 7, assuming that the CTS message comprises 4 OFDMA symbols and that there would be 4 STAs, then the first STA 404 may be allocated to the first OFDMA symbol, the second STA 406 may be allocated to the second OFDM symbols, and a third STA and a fourth STA (not shown) may be allocated the third and fourth OFDM symbols, respectively.

Similar to some first embodiments, the signature sequence may comprise additional information, e.g. it may report about the interference strength, which MCS it is able to receive, etc. Hence, this enables more freedom for each STA 404,406.

Aspects of Exemplary Embodiments

1. A method for multi-user clear-to-send signaling between a base station/access point, AP, and at least two wireless stations, STAs, wherein;
the AP sends a request to send, RTS, packet to at least two wireless stations, STAs, the RTS packet indicating what STA or a group of STAs is about to receive a transmission;
the RTS packet further indicating a configuration of a clear to send, CTS, packet to be used by said STA or a group of STAs when responding to the RTS, the configuration enabling the AP to identify what STA or a group of STAs sent the respective CTS. For example, this relates to Actions 501 and 901 previously described.
2. A method as in 1, wherein the configuration involves assigning a unique signature to be sent in association with the CTS packet. For example, this relates to Actions 501 and 902 previously described.
3. A method as in 2, wherein signature sequences allocated for the different STAs are orthogonal to one another. For example, this relates to Action 501 previously described.
4. A method as in any one of 1-3, wherein additional information is added in the signature, such as the interference strength, and/or MCS information. For example, this relates to Action 903 previously described.
5. A method as in any one of 1-4, wherein the signature is sent by augmenting the CTS in time, that is by adding a signature to a common part of the CTS, suitably after the common part of the CTS. For example, this relates to Actions 501 and 902 previously described.
6. A method as in 5, wherein different STAs are allocated to different sub-carriers, for example by adding a single OFDM symbol, and suitably using differential encoding based on the phase difference between different sub-carriers. For example, this relates to Actions 501 and 902 previously described.
7. A method as in 5, wherein different STAs are allocated to different consecutive OFDM symbols. For example, this relates to Actions 501 and 902 previously described.
8. A method as in any one of 5-7, wherein a small gap is introduced between the common part of the CTS and the signature part, e.g. with a gap length corresponding to a short interframe space (SIFS) or a reduced interframe space (RIFS). For example, this relates to Actions 501 and 902 previously described.
9. A method as in any one of 1-4, wherein the signature is sent by augmenting the CTS in frequency, that is by adding subcarriers to a common part of the CTS. For example, this relates to Actions 501 and 902 previously described.
10. A method as in 9, wherein different sets of sub-carriers are allocated to different STAs. For example, this relates to Actions 501 and 902 previously described.

Abbreviations

Abbreviation Explanation
ACK Acknowledgment
AP Access Point
BSS Basic Service Set
CSI Channel State Information
CTS Clear To Send
DL Downlink
ML Maximum Likelihood
MU-MIMO Multi User Multiple Input Multiple Output
NDP Null Data Packet
OBSS Overlapping BSS
MU-RTS Multi User Request To Send
STA Station
SU-MIMO Single User Multiple Input Multiple Output
TDD Time Division Duplex
UL Uplink
WLAN Wireless Local Area Network
ZF Zero Forcer

The invention claimed is:
1. A method, performed by an Access Point (AP), for Multi-User Clear-To-Send (MU CTS) signaling between the AP and at least one wireless station (STA), the method comprising:
 sending a Request To Send (RTS) packet directed to multiple STAs, wherein the RTS packet indicates:
  at least two STAs to which the AP would like to transmit; and
  a configuration of a Clear To Send (CTS) packet to be used by the at least two STAs when responding to the RTS packet, the configuration enabling the AP to identify the at least two STAs when the at least two STAs are transmitting a respective CTS packet; and
 receiving, from at least one STA, a respective CTS packet transmitted in accordance with the indicated configuration, thereby enabling the AP to identify the at least one STA transmitting the respective CTS packet.
2. The method of claim 1, wherein the configuration involves assigning a unique signature to be sent in association with the CTS packet, wherein the unique signature comprises a signature sequence uniquely allocated for the respective STAs.
3. The method of claim 2, wherein signature sequences allocated for different STAs are orthogonal to one another.
4. The method of claim 1, wherein different STAs are allocated to different sub-carriers.
5. The method of claim 4, wherein different STAs are allocated to different sub-carriers by adding a single Orthogonal Frequency-Division Multiplexing (OFDM) symbol and using differential encoding based on the phase difference between different sub-carriers.
6. The method of claim 5, wherein different STAs are allocated to different consecutive OFDM symbols.
7. The method of claim 1, wherein different sets of sub-carriers are allocated to different STAs.
8. An Access Point (AP) for Multi-User Clear-To-Send (MU CTS) signaling between the AP and at least one wireless station (STA), the AP comprising:
 processing circuitry;
 memory containing instructions executable by the processing circuitry whereby the AP is configured to:
  send a Request To Send (RTS) packet directed to multiple STAs, wherein the RTS packet indicates:
   at least two STAs to which the AP would like to transmit; and
   a configuration of a Clear To Send (CTS) packet to be used by the at least two STAs when responding to the RTS packet, the configuration enabling the AP to identify the at least two STAs when the at least two STAs are transmitting a respective CTS packet; and
  receive, from at least one STA, a respective CTS packet transmitted in accordance with the indicated configuration, thereby enabling the AP to identify the at least one STA transmitting the respective CTS packet.
9. The AP of claim 8, wherein the configuration involves assigning a unique signature to be sent in association with the CTS packet, wherein the unique signature comprises a signature sequence uniquely allocated for the respective STAs.
10. The AP of claim 9, wherein signature sequences allocated for different STAs are orthogonal to one another.
11. The AP of claim 8, wherein different STAs are allocated to different sub-carriers.
12. The AP of claim 11, wherein different STAs are allocated to different sub-carriers by adding a single Orthogonal Frequency-Division Multiplexing (OFDM) symbol and using differential encoding based on the phase difference between different sub-carriers.
13. The AP of claim 10, wherein different STAs are allocated to different consecutive Orthogonal Frequency-Division Multiplexing (OFDM) symbols.
14. The AP of claim 8, wherein different sets of sub-carriers are allocated to different STAs.
15. A method, performed by a wireless station (STA), for Multi-User Clear-To-Send (MU CTS) signaling between an Access Point (AP) and at least one wireless station (STA), the method comprising:
 receiving a Request To Send (RTS) packet from the AP, wherein the RTS packet indicates to the STA:
  at least two STAs to which the AP would like to transmit; and
  a configuration of a Clear To Send (CTS) packet to be used by the at least two STAs when responding to the RTS packet, the configuration enabling the AP to identify the respective one of the at least two STAs when the at least two STAs are transmitting the CTS packets; and sending, to the AP, a CTS packet in accordance with the indicated configuration, thereby enabling the AP to identify the STA.

16. The method of claim 15, further comprising associating a unique signature with the CTS packet, wherein the unique signature comprises a signature sequence uniquely allocated for the STA.

17. The method of claim 16, further comprising adding additional information in the signature, the additional information comprising at least one of interference strength and Modulation Coding Scheme (MCS) information.

18. The method of claim 16, wherein the associating comprises associating the unique signature with the CTS packet by augmenting the CTS packet in time by adding the signature to a common part of the CTS packet.

19. The method of claim 16, wherein the signature is added after a common part of the CTS packet.

20. The method of claim 19, wherein a gap is introduced between the common part of the CTS packet and a signature part comprising the unique signature.

21. The method of claim 20, wherein the gap has a gap length corresponding to a Short InterFrame Space (SIFS) or a Reduced InterFrame Space (RIFS).

22. The method of claim 16, wherein the associating comprises associating the signature with the CTS packet by augmenting the CTS packet in frequency by adding subcarriers to a common part of the CTS packet.

23. A wireless station (STA) for Multi-User Clear-To-Send (MU CTS) signaling between an Access Point (AP) and at least one wireless station (STA), the STA comprising:
processing circuitry;
memory containing instructions executable by the processing circuitry whereby the STA is configured to:
receive a Request To Send (RTS) packet from the AP, wherein the RTS packet indicates, to the STA:
at least two STAs to which the AP would like to transmit;
a configuration of a Clear To Send (CTS) packet to be used by the at least two STAs when responding to the RTS packet, the configuration enabling the AP to identify the at least two STAs when the at least two STAs are transmitting the CTS packets; and
send, to the AP, a CTS packet in accordance with the indicated configuration, thereby enabling the AP to identify the STA.

24. The STA of claim 23, wherein the instructions, when executed by the processing circuitry, configure the STA to associate a unique signature with the CTS packet, wherein the unique signature comprises a signature sequence uniquely allocated for the STA.

25. The STA of claim 24, wherein the instructions, when executed by the processing circuitry, configure the STA to add additional information in the signature, the additional information comprising at least one of interference strength and Modulation Coding Scheme (MCS) information.

26. The STA of claim 24, wherein the instructions, when executed by the processing circuitry, configure the STA to associate the unique signature with the CTS packet by augmenting the CTS packet in time by adding the signature to a common part of the CTS packet.

27. The STA of claim 26, wherein the instructions, when executed by the processing circuitry, configure the STA to add the signature after a common part of the CTS packet.

28. The STA of claim 27, wherein the instructions, when executed by the processing circuitry, configure the STA to introduce a gap between the common part of the CTS packet and a signature part comprising the unique signature.

29. The STA of claim 28, wherein the gap has a gap length corresponding to a Short InterFrame Space (SIFS) or a Reduced InterFrame Space (RIFS).

30. The STA of claim 24, wherein the instructions, when executed by the processing circuitry, configure the STA to associate the unique signature with the CTS packet by augmenting the CTS packet in frequency by adding subcarriers to a common part of the CTS packet.

31. A computer program product stored in a non-transitory computer readable medium for Multi-User Clear-To-Send (MU CTS) signaling between an Access Point (AP) and at least one wireless station (STA), the computer program product comprising software instructions which, when run on the processing circuitry of the AP, causes the AP to:
send a Request To Send (RTS) packet directed to multiple STAs, wherein the RTS packet indicates:
at least two STAs to which the AP would like to transmit; and
a configuration of a Clear To Send (CTS) packet to be used by the at least two STAs when responding to the RTS packet, the configuration enabling the AP to identify the at least two STAs when the at least two STAs are transmitting a respective CTS packet; and
receive, from at least one STA, a respective CTS packet transmitted in accordance with the indicated configuration, thereby enabling the AP to identify at least one STA transmitting the respective CTS packet.

32. A computer program product stored in a non-transitory computer readable medium for Multi-User Clear-To-Send (MU CTS) signaling between an Access Point (AP) and at least one wireless station (STA), the computer program product comprising software instructions which, when run on the processing circuitry of a first STA, causes the first STA to:
receive a Request To Send (RTS) packet from the AP, wherein the RTS packet indicates to the first STA:
at least two STAs to which the AP would like to transmit; and
a configuration of a Clear To Send (CTS) packet to be used by the at least two STAs when responding to the RTS packet, the configuration enabling the AP to identify the respective one of the at least two STAs when the at least two STAs are transmitting the CTS packets; and
send, to the AP, a CTS packet in accordance with the indicated configuration, thereby enabling the AP to identify the first STA.

* * * * *

UNITED STATES PATENT AND TRADEMARK OFFICE
CERTIFICATE OF CORRECTION

PATENT NO. : 10,075,274 B2
APPLICATION NO. : 15/029386
DATED : September 11, 2018
INVENTOR(S) : Wilhelmsson et al.

It is certified that error appears in the above-identified patent and that said Letters Patent is hereby corrected as shown below:

In the Specification

In Column 1, Line 21, delete "(IEEE 802)," and insert -- (IEEE 802). --, therefor.

In Column 1, Line 44, delete "STA STA1" and insert -- STA, STA1 --, therefor.

In Column 1, Line 45, delete "AR" and insert -- AP. --, therefor.

In Column 1, Line 62, delete "802.11," and insert -- 802.11. --, therefor.

In Column 1, Line 63, delete "art," and insert -- art. --, therefor.

In Column 3, Line 16, delete "RTSiCTS" and insert -- RTS/CTS --, therefor.

In Column 3, Line 26, delete "s" and insert -- is --, therefor.

In Column 3, Line 39, delete "s" and insert -- is --, therefor.

In Column 5, Line 41, delete "STA;" and insert -- STA. --, therefor.

In Column 5, Line 62, delete "STA STA1" and insert -- STA, STA1 --, therefor.

In Column 5, Line 66, delete "STA STA1" and insert -- STA, STA1 --, therefor.

In Column 6, Line 2, delete "STA STA1" and insert -- STA, STA1 --, therefor.

In Column 6, Line 7, delete "STA STA1" and insert -- STA, STA1 --, therefor.

In Column 6, Line 9, delete "STA STA1 more bandwidth" and insert -- STA, STA1 more bandwidth. --, therefor.

Signed and Sealed this
Twenty-second Day of September, 2020

Andrei Iancu
*Director of the United States Patent and Trademark Office*

CERTIFICATE OF CORRECTION (continued)
U.S. Pat. No. 10,075,274 B2

In Column 6, Line 50, delete "However" and insert -- However, --, therefor.

In Column 8, Line 27, delete "402," and insert -- 402. --, therefor.

In the Claims

In Column 20, Line 37, in Claim 31, delete "identify" and insert -- identify the --, therefor.